R. M. DIXON.
DIRECT STEAM HEATING SYSTEM FOR RAILWAY CARS.
APPLICATION FILED AUG. 29, 1908.

1,149,740.

Patented Aug. 10, 1915.
5 SHEETS—SHEET 1.

WITNESSES

INVENTOR
R. M. Dixon
BY
ATTORNEYS

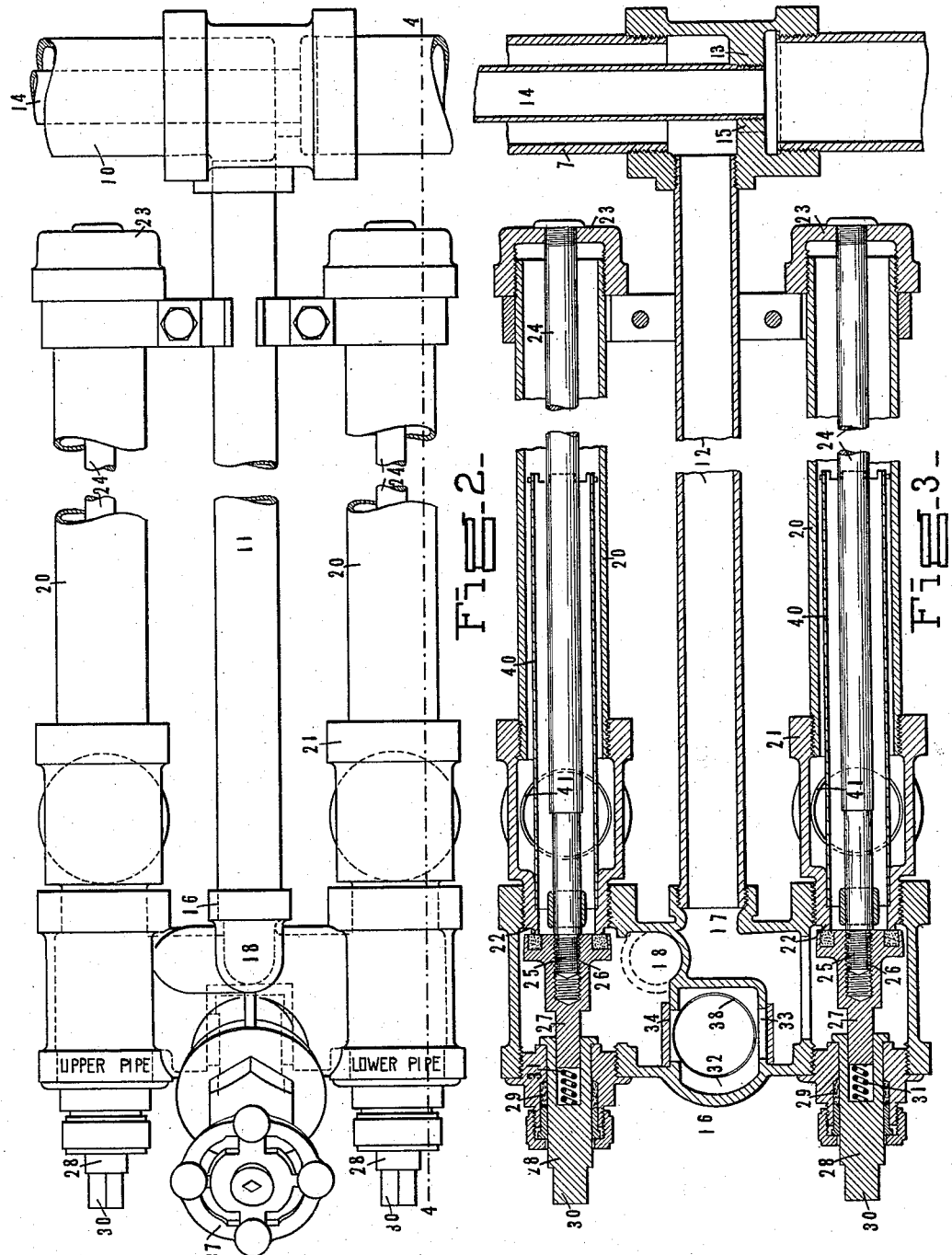

R. M. DIXON.
DIRECT STEAM HEATING SYSTEM FOR RAILWAY CARS.
APPLICATION FILED AUG. 29, 1908.

1,149,740.

Patented Aug. 10, 1915.
5 SHEETS—SHEET 3.

WITNESSES

INVENTOR
BY
ATTORNEYS

COLUMBIA PLANOGRAPH CO., WASHINGTON, D. C.

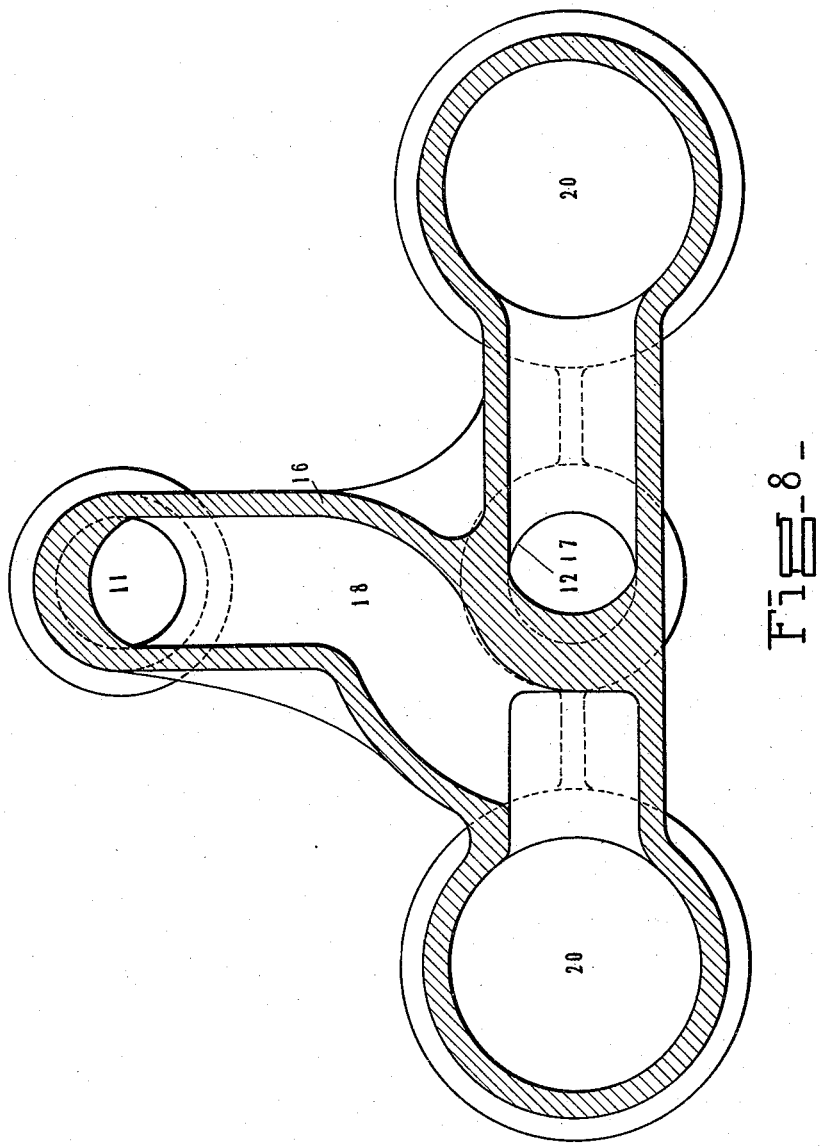

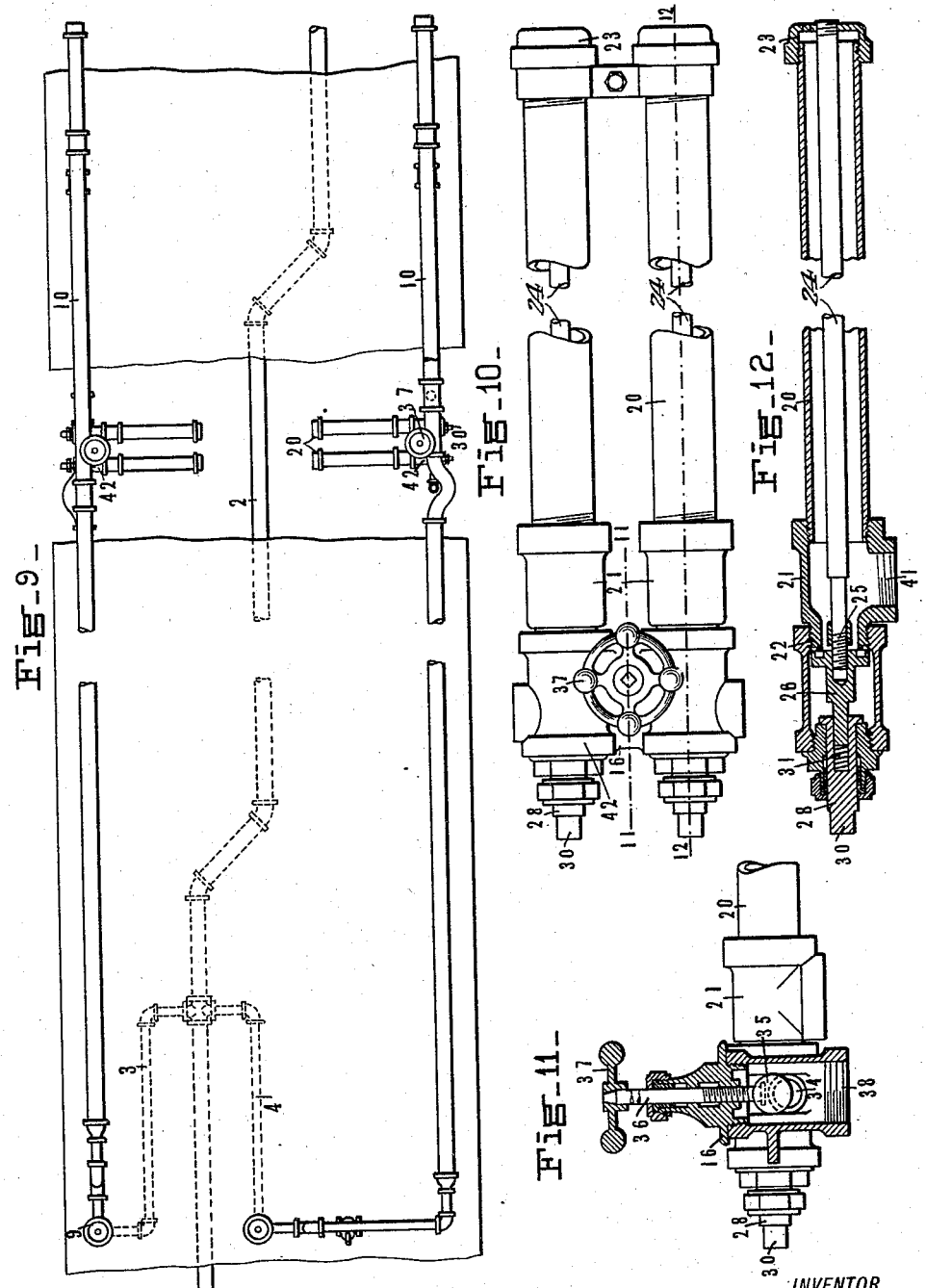

UNITED STATES PATENT OFFICE.

ROBERT M. DIXON, OF EAST ORANGE, NEW JERSEY, ASSIGNOR, BY MESNE ASSIGNMENTS, TO STANDARD HEAT AND VENTILATION COMPANY, INC., OF NEW YORK, N. Y., A CORPORATION OF NEW YORK.

DIRECT STEAM-HEATING SYSTEM FOR RAILWAY-CARS.

1,149,740.     Specification of Letters Patent.     Patented Aug. 10, 1915.

Application filed August 29, 1908. Serial No. 450,875.

*To all whom it may concern:*

Be it known that I, ROBERT M. DIXON, a citizen of the United States, residing at East Orange, in the county of Essex and State of New Jersey, have invented certain new and useful Improvements in Direct Steam-Heating Systems for Railway-Cars, of which the following is a full, clear, and exact description, such as will enable others skilled in the art to which it appertains to make and use the same.

This invention relates to heating systems and more particularly to direct steam heating systems for railway cars or like structures.

One of the prime objects of the present invention is to provide a heating system of the above character such that the temperature of the interior of the car may be more conveniently regulated to meet varying climatic conditions.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
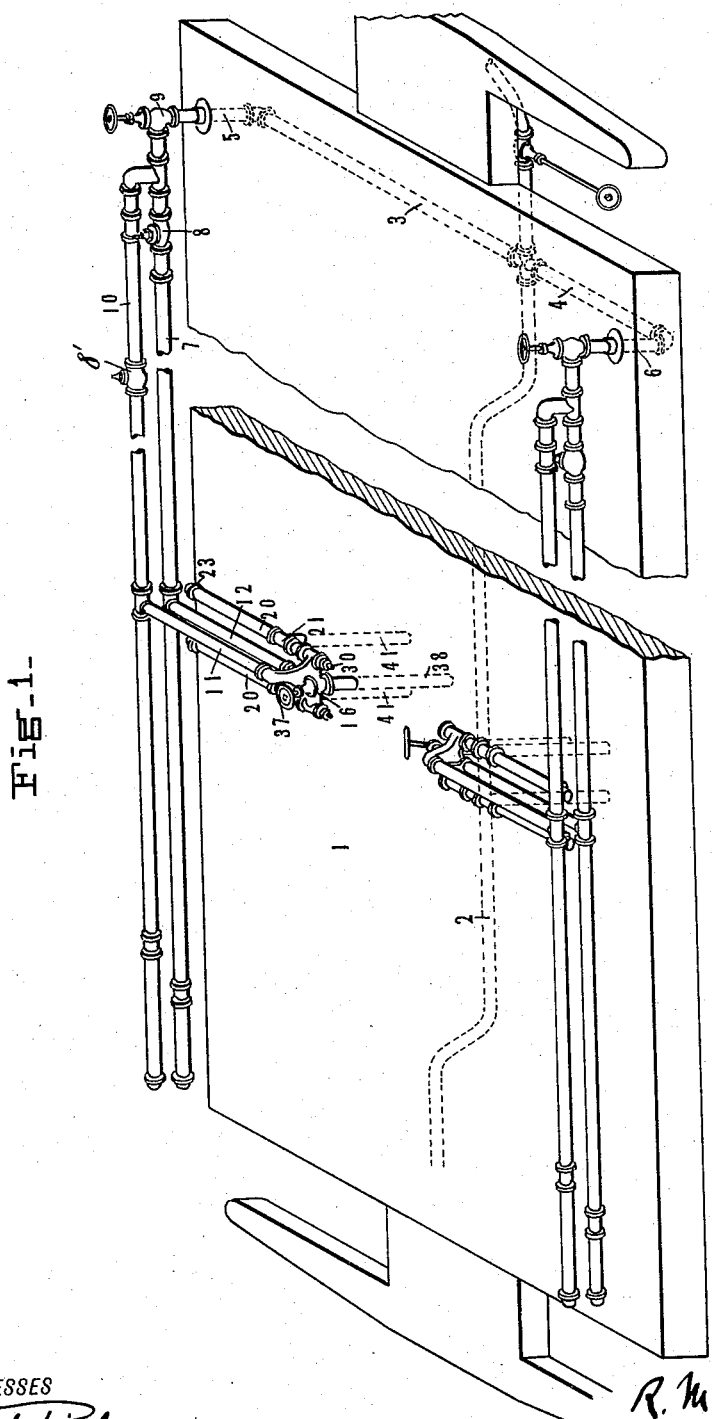
Figure 4:
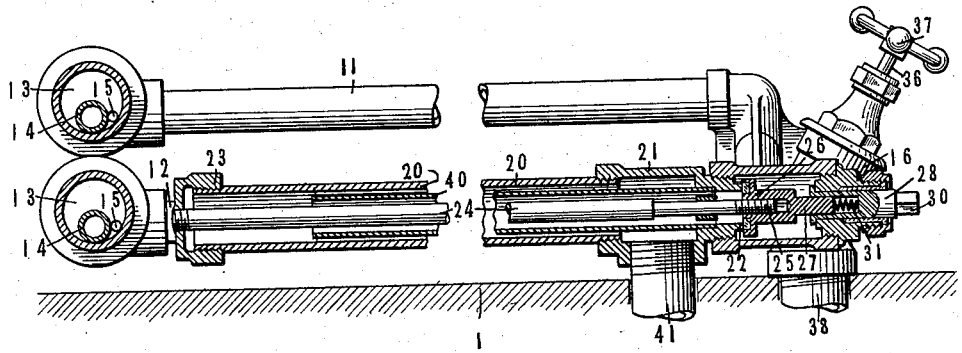
Figure 5:
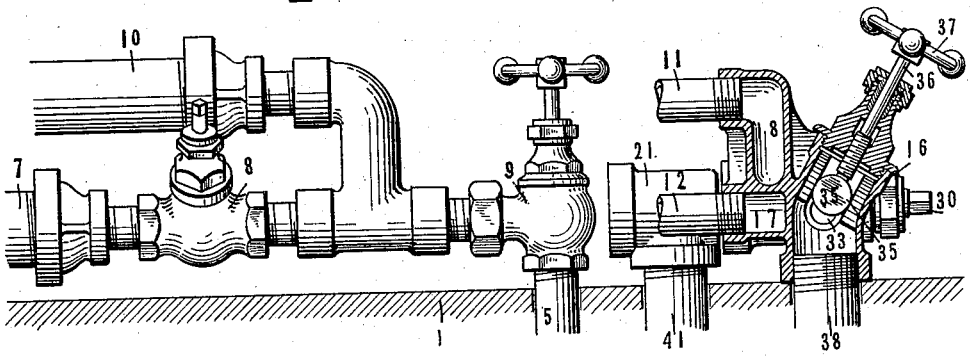
Figure 6:
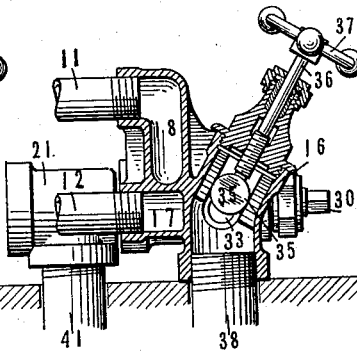
Figure 7:
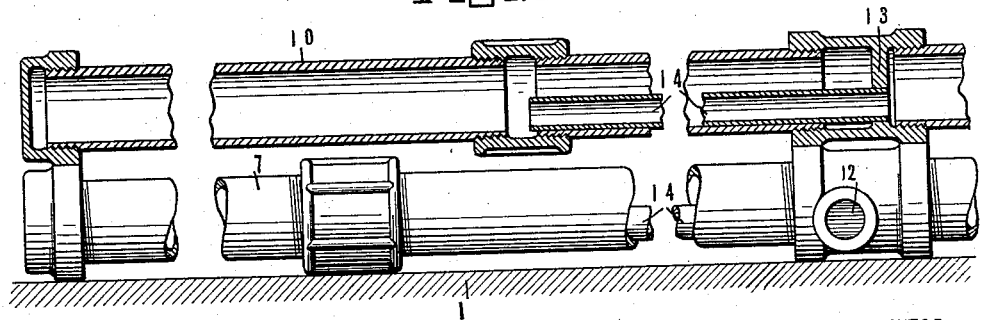

In the accompanying drawings wherein is illustrated two of various possible embodiments of my invention, Figure 1 is a view in perspective showing the floor plan of a railway car equipped with a heating system constructed in accordance with one embodiment thereof; Fig. 2 is a top plan view of the discharge portion of the heating system; Fig. 3 is a horizontal sectional view taken through Fig. 2; Fig. 4 is a vertical sectional view taken substantially on line 4—4 of Fig. 2, and showing the construction of the means for discharging the water of condensation from the heating system; Fig. 5 is a view in elevation of the inlet end of the heating system; Fig. 6 is a view partly in section and partly in elevation, showing the blow-off valve; Fig. 7 is a view partly in elevation and partly in vertical section showing the means whereby the steam is carried to the ends of the radiating pipes; Fig. 8 is a view in vertical section showing the interior construction of the blow-off and discharge portion of the system; Fig. 9 is a top plan view of a different embodiment of the invention; Fig. 10 is a similar view of a portion of the apparatus shown in Fig. 9; Fig. 11 is a vertical sectional view taken substantially on line 11—11 of Fig. 10; and Fig. 12 is a vertical sectional view taken on the line 12—12 of Fig. 10.

Similar reference characters refer to similar parts throughout the several views of the drawings.

Referring now to the drawings, and particularly to that embodiment of my invention illustrated in Figs. 1 to 8 inclusive, 1 indicates the floor of a railway car under which extends the usual train pipe 2 which receives its steam from a connection with the locomotive boiler or other source of steam supply. Extending from train pipe 2 are branch pipes 3 and 4 respectively, said branch pipes leading to the sides of the car and being provided with risers as at 5 and 6 which extend upward through the floor of the car. Inasmuch as the radiating systems upon the opposite sides of the car are identical, a description of one thereof, it is thought, will suffice to impart a clear understanding of the invention. The riser 5 is provided with a valve as at 9 and leading from this valve is a short length of piping 7′, connected at the opposite end thereof with a valve as at 8 which is in turn connected to a radiating pipe 7 extending longitudinally of the car substantially from end to end thereof. Leading from the piping 7′ is a second radiating pipe 10 which also extends longitudinally of the car in parallel relation with pipe 7 and is provided with a valve as at 8′.

It will be seen that by properly manipulating valves 8′ and 8, either or both of the radiating pipes 7 and 10 may be supplied with steam. Pipes 7 and 10 intermediate their ends are provided with discharge conduits 11 and 12, which in the present instance are arranged one above the other and lead toward the central portion of the car. A diaphragm as at 13 is provided in each of the radiating pipes between the discharge conduit thereof and the inlet end, and extending from an aperture provided in diaphragm 13 is a conduit 14 which extends to a point near the opposite end of the radiating pipe as shown in Fig. 7 of the drawings. This conduit insures that the steam shall pass to the ends of the radiating pipe before flowing back to be discharged from the system. In order to accommodate any water of condensation which may form between the discharge conduits and the inlet ends of the radiating pipes the diaphragms 13 are provided with minute apertures as at 15 through which any of such water of condensation may pass directly into the discharge conduit.

The discharge conduits 11 and 12 lead into a special fitting 16 provided interiorly with conduits 17 and 18, into which lead respectively the discharge conduits 11 and 12. Conduits 17 and 18 also lead out of the fitting 16 and the discharge ends of said conduits lead into trap apparatus which is adapted to automatically discharge the water of condensation from the various radiating pipes. In the present instance each of the discharge conduits is provided with an independent trap so that each of the several radiating pipes may act independently of the others. Each trap in the present instance is constituted by a capped tube 20 which is preferably formed of a metal having a high co-efficient of expansion such as brass. The pipe 20 leads from a T fitting 21 which is threaded into the fitting 16, said T being provided with discharge pipes which lead the water of condensation downward through the floor of the car. A valve seat is formed interiorly of fitting 16 upon the end of the T as at 22. Threaded in the cap 23 of the brass pipe 20 is a rod 24, said rod being preferably formed of a metal having a relatively low coefficient of expansion such as iron. This rod extends lengthwise of the pipe 20 and terminates within the fitting 16, the end thereof being threaded, as at 25, to receive the valve 26 which coöperates with the seat 22. Valve 26 is provided with a squared head 27 which is received in a similarly formed socket in a stem 28 which extends exteriorly of fitting 16 through a gland 29. This stem is also provided with a squared head, as at 30, to receive a wrench or other turning implement. A spring 31 is interposed between the head 27 and the bottom of the socket in the stem 28 and maintains the latter in operative position. Fitting 16 is provided with a chamber 32 which is in communication, by means of ports 33 and 34, respectively, with each of the conduits 17 and 18, said ports being adapted to be closed by a double gate valve 35 provided with a stem 36 which extends exteriorly of the casing and is provided with an operating handle 37. Leading from chamber 32 is a pipe 38 which extends downwardly through the floor of the car. Chamber 32 being common to both of the discharge conduits, provides a channel through which either of the radiating pipes may be discharged directly into the atmosphere.

In order to bring a larger amount of the water of condensation into contact with the brass tube 20 and the iron rod 24, a spur tube 40 is fastened interiorly of the T 21 and extended about the rod 24 to a point intermediate the ends of the tube 20. The water of condensation flows through this spur tube and returns through tube 20 to the discharge pipe 41 which extends downwardly through the floor of the car to the atmosphere.

In the above described embodiment of my invention, it will be noted that the discharge conduits and valve mechanism are located within the car, and that the thermostatic means is, therefore, susceptible to influence by the interior heat conditions of the car, as well as by the temperature of the water of condensation. In Figs. 9 to 12, however, I have shown a different embodiment of the invention, the main difference residing in the fact that the discharge conduits lead from the radiating pipes directly through the floor of the car to a fitting 42 similar to that shown at 16 in the first described embodiment. In the traps employed in this embodiment of my invention the inner pipe 40 is omitted and small apertures are formed in the caps at the end of the traps, so that the steam going through them will heat the brass pipe in a manner similar to that described in the first embodiment, whereupon the traps will operate to discharge the water of condensation. The stem of the gate valve in this embodiment of the invention extends upwardly through the floor of the car, so that the said valve may be manipulated to blow-off the system from the position interiorly of the car

Having thus described the construction of these two embodiments of the invention the operation thereof, which to a large extent should be obvious, is substantially as follows: In starting the system in operation valve 9 is opened to allow steam to flow into the pipe connection 7' and either or both of the valves 8 and 8' are opened, whereupon steam will flow into either or both of the radiating pipes 7 and 10, as the case may be. At this point it may be noted; that while I have shown two radiating pipes located on each side of the car, any number thereof may be added without departing from the spirit of the invention. The steam will then pass through the radiating pipes, thence through the tubes 14, the water of condensation being discharged through the discharge pipes 11 and 12 through the automatic traps which act in accordance with the temperature of the water of condensation to discharge the same from the system. The valves 25 of the traps have previously been set, of course, to proper positions to enable the differences in expansion of the tube 20 and the rod 24 to open and close the valves so as to maintain an even temperature within the car. Should any matter accumulate within the system the same may be blown out through the discharge pipe 38 by opening the gate valve 35, which not only shuts off the blow-off passage for the steam, but separates the fitting into two separate chambers which discharge into their respective traps. Any water of condensation forming in the radiating pipes between the diaphragm and the inlet ends thereof is discharged through apertures 15, said apertures being so small as to permit of very little steam passing therethrough.

It will be seen that I have described a construction well adapted to attain the several aims and objects of the invention in an exceedingly simple yet efficient manner. One important advantage residing in the use of the present apparatus is the fact that the steam supplied to the system may be exactly regulated in accordance with the climatic conditions, either one or a greater number of radiating pipes being susceptible of being put into operation through a simple manipulation of valves located entirely within the car.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. A steam heating system having a plurality of radiating pipes, means for supplying steam thereto, each of said radiating pipes having an individual outlet for water of condensation, and said steam heating system including an independent outlet for water of condensation common to all of said radiating pipes, and a single valve member adapted to open and close communication between each of said radiating pipes and said common outlet according to adjustment, and said valve adapted to close communication between said radiating pipes at their discharge ends when adjusted to cause each radiating pipe to vent solely through its individual outlet.

2. A heating system having a plurality of radiating pipes, means for supplying steam thereto, each of said radiating pipes having an individual outlet for water of condensation, said steam heating system including an independent outlet for water of condensation common to said radiating pipes, and a single valve-mechanism adapted to open and close communication between each of said radiating pipes and said independent outlet according to the adjustment of said valve-mechanism, the construction of said valve mechanism being such that when it opens the common outlet it also necessarily opens the communication between said radiators and when it closes the common outlet it necessarily closes the communication between said radiators.

3. A steam heating system having a plurality of radiating pipes, means for supplying steam thereto, each of said radiating pipes having an individual outlet for water of condensation that is controlled by a trap which acts in accordance with the temperature of the water to be discharged, said steam heating system including an independent outlet for water of condensation common to all of said radiating pipes, and a single valve mechanism comprising a double gate valve adapted when in open position to open communication between each of said radiating pipes and said independent outlet, and when in closed position to close the communication between said radiators and said common outlet, the construction being such that when said valve is in open position it necessarily opens a communication between said radiating pipes and when in closed position it necessarily closes said communication between said pipes.

In testimony whereof I affix my signature, in the presence of two witnesses.

ROBERT M. DIXON.

Witnesses:
JOHN T. CLARK,
E. E. ALLBEE.